United States Patent [19]

Lin

[11] 4,240,864
[45] Dec. 23, 1980

[54] SPRAY SPINNING COLLECTION UNIT
[75] Inventor: Victor J. Lin, Berkeley Heights, N.J.
[73] Assignee: Celanese Corporation, New York, N.Y.
[21] Appl. No.: 42,695
[22] Filed: May 25, 1979
[51] Int. Cl.³ ............................................. D04H 3/00
[52] U.S. Cl. .................................. 156/441; 156/167; 156/195; 156/443; 156/446
[58] Field of Search ............... 156/195, 167, 443, 446, 156/169, 433, 441

[56] References Cited

U.S. PATENT DOCUMENTS

| | | | |
|---|---|---|---|
| 3,498,862 | 3/1970 | Comastri et al. | 156/195 |
| 3,801,400 | 4/1974 | Vogt et al. | 156/167 |
| 4,021,281 | 5/1977 | Dall | 156/167 |

Primary Examiner—David A. Simmons
Attorney, Agent, or Firm—John A. Shedden

[57] ABSTRACT

A spray spinning collection unit includes a cylindrical collection mandrel and a cooperating press roll. The cooperating press roll has a peripheral surface disposed adjacent to a cylindrical surface of the mandrel so as to define a gap therebetween. To provide a predetermined radial density gradient in a cylindrical nonwoven product formed by the gap between the press roll and the mandrel, the gap has a varying height defined by the contour of the peripheral surface. The contour is selected to give the predetermined radial density gradient. Portions of the peripheral surface of the press roll may be either convex, concave, or both.

9 Claims, 6 Drawing Figures

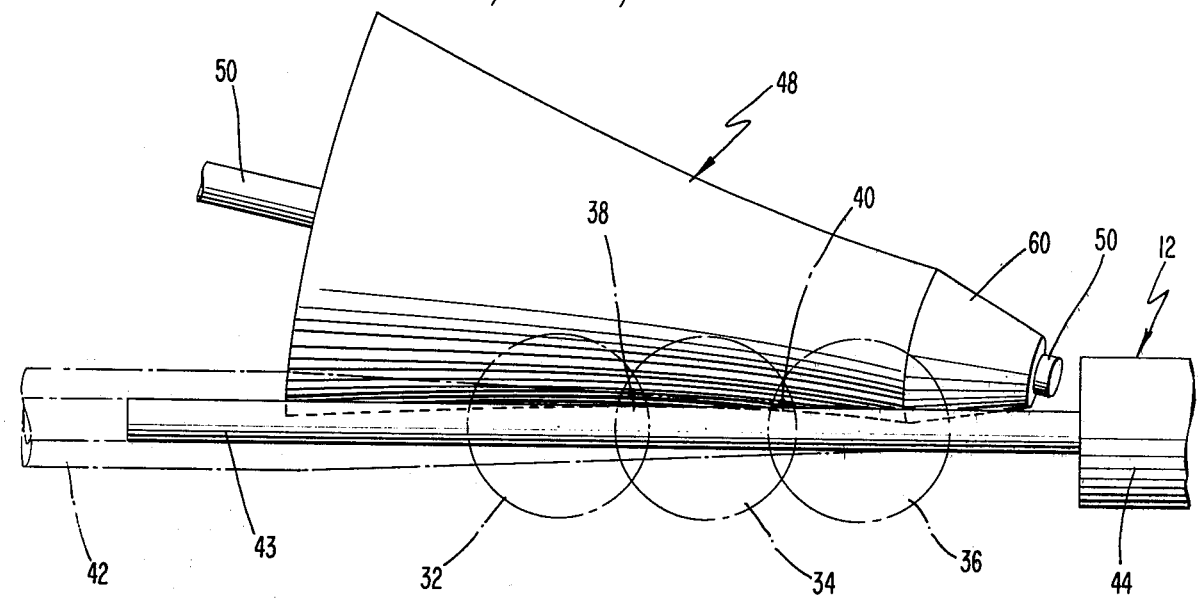
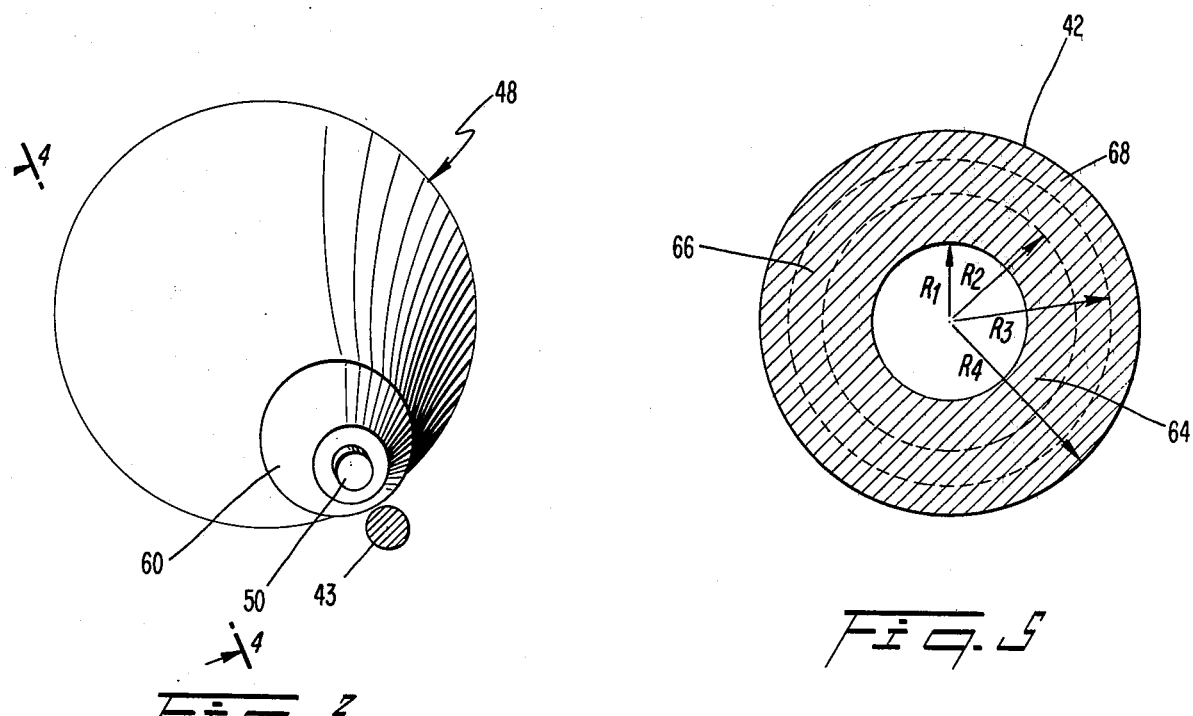

4,240,864

SPRAY SPINNING COLLECTION UNIT

BACKGROUND OF THE INVENTION

The present invention relates generally to collection devices for fashioning a tubular member of indefinite length from substantially continuous filaments of synthetic resinous material. More particularly, the present invention relates to configurations of a press roll which permit controlled radial density variation in the tubular product.

In the spray spinning art, synthetic resinous material is plasticated and pumped through filament shaping orifices to produce one or more filaments. Gaseous jets then act on the filaments to attenuate the filaments to a comparatively fine diameter and convey the filaments to a downstream collection device. Non-woven products of various configurations can be manufactured in this manner. For example, when a downstream collection device is a flat or curved surface or a set of parallel rolls, the resulting product is a generally a planar web of indefinite length. Another type of collection device which may be used with spray spinning apparatus is a rotating mandrel on which the filaments accumulate while the previously deposited filaments are withdrawn axially thereby producing a generally cylindrical member of indefinite length.

In the past, the production of cylindrical or tubular members of spray spun material has also been accomplished using a cylindrical mandrel and one or more generally cylindrical rolls which urge the tubular member axially off the mandrel. In some instances, these cooperating rolls may also compress the spray spun material during its accumulation on the mandrel. In either event, this cooperation between the press roll and the mandrel produces a tubular element having a radial density variation which decreases in a radially outwardly direction. In many applications for nonwoven tubular members it is desirable to have a uniform radial density variation, or a radial density variation which changes in a predetermined manner. Accordingly, the prior art devices have not been entirely satisfactory.

One specific example of a use for nonwoven tubular spray spun elements is a filter medium. If the filter medium has a high density on the fluid entering side, the particles will accumulate on the surface and prematurely clog the filter. Naturally, there are instances in which a predetermined radial density gradient in a filter medium is desirable: for example, where the particles to be filtered passes radially inwardly through the body, it may be desirable to have a density variation which increases in the radially inward direction. In this manner, larger particles accumulate in the lower density portions of the filter so as not to prematurely block the finer or higher density portions of the filter. Conversely, where a fluid passes radially outwardly through the filter medium, it will occasionally be desirable to have a density variation which increases in the radially outward direction. Similar considerations to those just discussed apply as to particle size and blockage for an outwardly increasing density variation.

It has been proposed to fabricate a cylindrical filter element with a radial density gradient by using a fiberizing assembly having a plurality of filament-producing orifices arranged in a row and inclined at an acute angle with respect to the axis of the collection mandrel, see for example U.S. Pat. Nos. 3,933,557 and 4,021,281, issued to Pall. In this type of an assembly, the spacing between the filament-producing orifices may be varied and/or the angle at which the row of orifices inclined with repsect to the mandrel itself may be varied.

Such devices as those disclosed by the Pall patents do not, however, permit density variations to be created which exceed that naturally laid down by the spray spinning head. Moreover, the tubular product requires a separate device to physically withdraw the tubular product from the mandrel. Another difficulty with varying the orifice spacing and inclination angle is that the spray spinning mechanism must be changed or reoriented for each different density gradient. Such adjustments and orientation changes require substantial expense and consume much time since the plasticated material must pass through any adjustable or adjusted connection which is made.

U.S. Pat. Nos. 3,787,265 and 3,801,400, both assigned to the same assignee as the instant invention, show processes wherein weight changes in tubular idler rolls are used to compress the tacky fibers thereby inducing density variations in different layers of cylindrical self-bonded non-woven structures.

Accordingly, the need continues to exist for an economical and efficient means whereby the radial density gradient of a nonwoven tubular spray spun product may be varied at will with comparative ease.

SUMMARY OF THE INVENTION

Problems of the type noted above may be avoided by using a collection device having two parts: a collection mandrel which is rotatably mounted and includes a generally cylindrical external surface; and a press roll having a peripheral surface positioned adjacent to the cylindrical mandrel so as to define a gap therebetween that extends generally axially along the mandrel with a varying height relative to the mandrel.

By appropriately configuring the peripheral surface of the press roll, a predetermined radial density variation in the collected spray spun material may be developed as the material is projected against and accumulates on the mandrel. Moreover, known variations in the distribution of filamentary material axially along the mandrel can be accommodated in the design of the press roll.

In order to avoid the need for an independent device to physically withdraw the tubular product from the rotating mandrel, the press roll and the gap defined between the press roll and the mandrel are configured so as to squeeze the tubular product as it is formed and urge it axially off the mandrel.

Moreover, depending upon the angle of inclination between the press roll shaft and the mandrel, portions of the surface of the press roll may be either concave, convex, or both.

The pressure exerted between the press roll and the mandrel is also effective to enhance the filament-to-filament bonding that occurs as filaments are deposited on the mandrel.

DESCRIPTION OF THE DRAWINGS

Many objects and advantages of the present invention will be apparent to those skilled in the art when this specification is read in conjunction with the attached drawings wherein like reference numerals have been applied to like elements and wherein:

FIG. 2 is an elevational view of the collection system in accordance with the present invention;

FIG. 3 is a view in partial cross section taken along the line 3—3 of FIG. 1;

FIG. 5 is a cross-sectional view through a nonwoven tubular product produced by the spray spinning device of FIG. 1.

DESCRIPTION OF THE PREFERRED EMBODIMENTS

Figure 1:
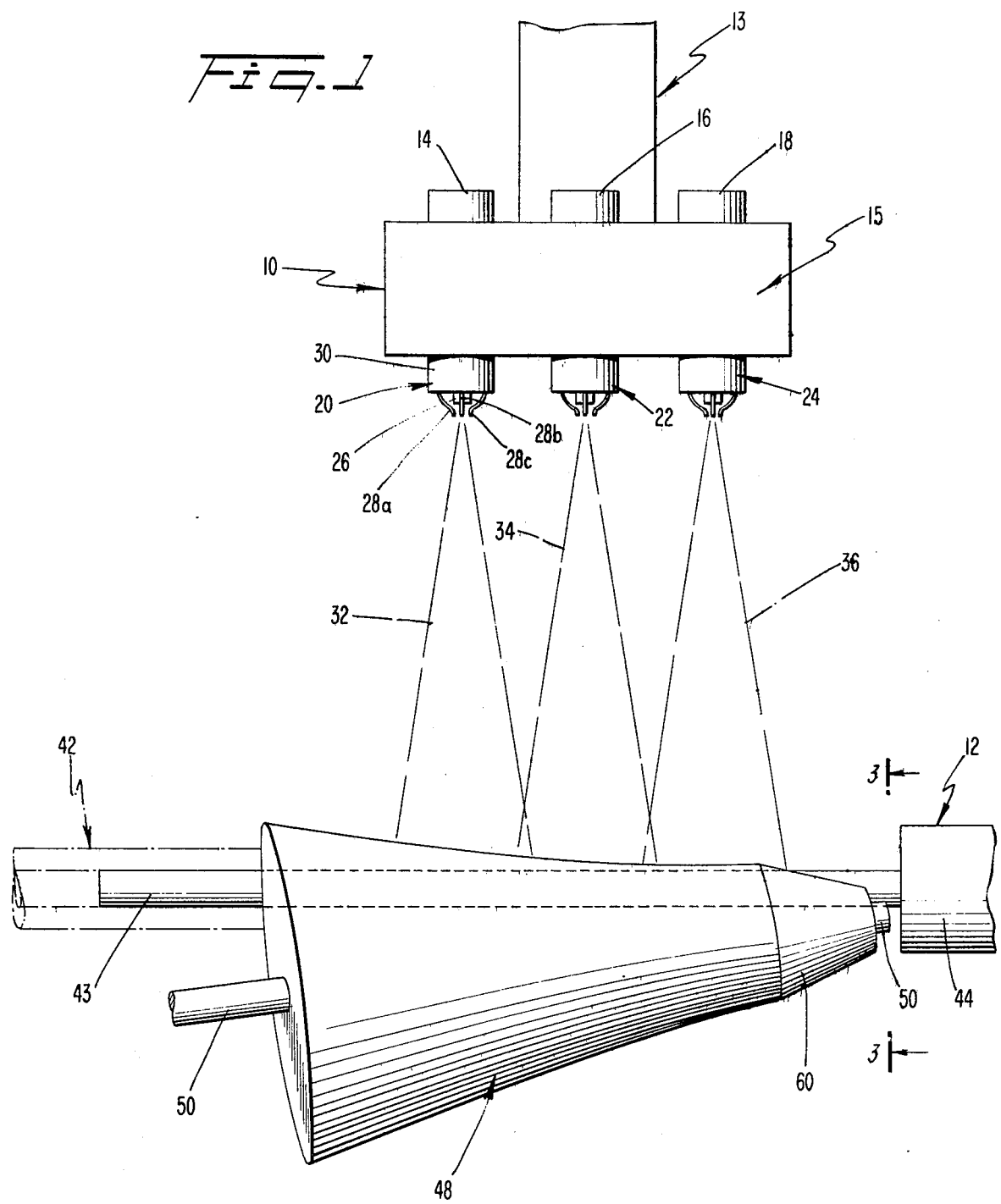
FIG. 1 is a plan view illustrating a spray spinning device and a collection system in accordance with the present invention.

Turning now to FIG. 1, spray spinning apparatus is disclosed which incorporates a collection device in accordance with the present invention. The spray spinning apparatus includes a spray spinning means 10 and a collection means 12. While the present invention is primarily concerned with the improved collection means 12, it will be instructive to describe briefly some of the features of the spray spinning means 10.

The spray spinning means 10 is preferably located at the end of an extrusion device 13 which supplies a substantially continuous flow of plasticated synthetic resinous material from which one or more filaments are eventually formed. One extrusion device which has been found to perform satisfactorily is a Modern Plastic Machinery Corp. 1" extruder. Flow from the extruder 13 is supplied to each of a plurality of melt pumps 14, 16, 18, which are arranged in a generally planar row in a manifolding device 15. A suitable melt pump is a Zenith Corp. high temperature metering pump having a capacity of 1.168 cc/revolution. While three melt pumps are disclosed in FIG. 1, it is within the scope of the invention to supply a plurality of melt pumps greater than or less than three.

Eavch of the melt pumps 14, 16, 18, pressurizes the synthetic resinous material supplied thereto from the extruder 13 and delivers the pressurized melt flow to a corresponding filament-forming nozzle assembly 20, 22, 24.

Preferably, each of the nozzle assemblies 20, 22, 24, is identical. It will, therefore, suffice to only describe the details of one such nozzle, it being understood that the other nozzle assemblies exhibit similar features. The nozzle assembly 20 includes a filament-forming orifice body 26 having an orifice opening through which the pressurized molten synthetic resinous material is forced and shaped into a substantially continuous filament. Surrounding the orifice body 26 is a plurality of gaseous jet conduits 28a, 28b, 28c, from which a corresponding plurality of gaseous jets are discharged. These jets convey the continuous molten filament emanating from the opening of the orifice body 26 downstream toward the collection device 12 by attenuating the molten filament to reduce its diameter and impart molecular orientation to it thereby rendering it a substantially continuous solidified filament. Preferably, pressurized air at essentially ambient temperatures may be used as the gaseous fluid of the jets.

Each conduit 28a, 28b, 28c, extends forwardly from an air manifold 30 which receives pressurized air from a suitable conventional source (not shown).

Action of the air jets emanating from the conduits 28a, 28b, 28c, on the continuous molten filament causes the filament to be randomly distributed within the confines of an imaginary spray cone, the boundaries of which are identified at 32, 34, 36, for each corresponding nozzle assembly 20, 22, 24. As will be apparent from FIG. 1, the imaginary cones 32, 34, 36, have parallel axes, and laterally intersect one another before actually reaching the collection means 12. To assure that the imaginary spray cones 32, 34, 36, do intersect one another prior to reaching the collection means 12, lateral spacing between the orifice openings of the nozzle assemblies 20, 22, 24 (or the axes of the imaginary cones) must be selected in accordance with the typical shape of the imaginary spray cone 32 for the specific nozzle assembly being used. In this connection, the angular divergence of each imaginary spray cone 32 will be a function of several variables including, for example, the number of attenuating gaseous jets, the angular inclination of the gaseous jets relative to the axis of the nozzle body 26, and the velocity of the gaseous jets relative to the filament itself.

Turning now to FIG. 2, it will be seen that the overlapped portions 38, 40 of the imaginary spray cones 32, 34, 36 are designed so as to ensure the best uniformity of "mass-laydown" concommitant with the density gradient sought to be established by the curvature configuration of the press roll. For purposes of the present discussion, the distribution of the substantially continuous filament throughout each of the imaginary cones 32, 34, 36 is assumed to be predetermined and, preferably, uniform. The axes of the imaginary spray cones 32, 34, 36 are (see FIG. 1) generally perpendicular to the axis of a collection mandrel 43 in the collection assembly 12. In this fashion, the filaments at any lateral location in the imaginary cone is likely to have the same level of thickness. When the imaginary spray cone axes are aligned to perpendicularly intersect the axis of the mandrel 43 (see FIG. 2), filaments are equally distributed on each side of the mandrel. However, equal distribution of filaments on each side of the mandrel is not necessary. As long as a fraction of the imaginary cone intersects with the mandrel axes, filaments can be wound up onto the mandrel due to the rotation of the mandrel.

Returning now to FIG. 1, the collection device 12 includes the mandrel means 43 which is rotatably mounted by means of a suitable conventional driving assembly 44. The driving assembly 44 is adapted to rotate the generally cylindrical mandrel 43 at a predetermined rate of speed. The preferred range of speed is from about 300 rpm to about 3000 rpm. The mandrel 42 has a very smooth external cylindrical surface which defines the inner diameter of the tubular product 42 produced by the spray spinning apparatus. The mandrel is slightly tapered towards the free end to facilitate the axial movement of the non-woven tube.

In order to define the outer cylindrical surface of the tubular product 42, a press roll 48 is rotatably mounted on a shaft 50 and is operatively positioned adjacent to the cylindrical mandrel 43. As can be seen from FIG. 3, the axis of the press roll 48 and the axis of the mandrel 43 are slightly skewed to assist in the continuous movement of the tubular product toward the free end of the mandrel.

Figure 4:
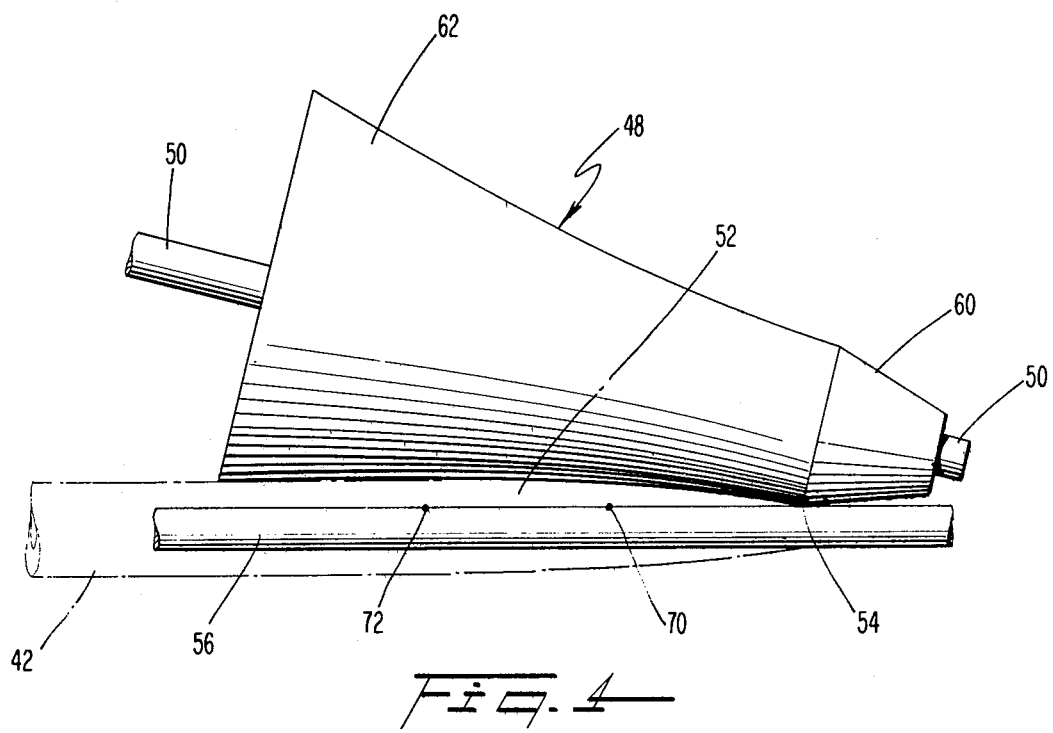
FIG. 4 is a view taken along the line 4—4 of FIG. 3 to illustrate the gap defined between the press roll and the mandrel.

With the mandrel 43 rotating in a counterclockwise direction as viewed in FIG. 3, the press roll 48 is rotated in a clockwise direction. Accordingly, as the substantially continuous filaments within the imaginary cone 36 are projected against and deposited on the mandrel 43 (see FIG. 4), they are collected by the mandrel 43 as well as a contoured peripheral surface of the press roll 48 and compressed in the space between the press roll 48 and the mandrel 43. For purposes of this invention, "contoured" as used in connection with the press roll surface is intended to include portions of the peripheral surface which are concave, convex, or both.

The press roll 48 cooperates with the mandrel 43 to define a gap 52 which varies from a minimum value at one end 54 to a maximum value at a second end 56 in accordance with a predetermined variation. The gap 52 may be considered to have a radially extending height measured in a direction relative to the axis of the mandrel 43. It will be observed from FIG. 4 that at the second end 56, the gap 52 has a maximum radial height. The final radial thickness of the tubular product depends on the extreme end of the last fiber spray pattern.

The press roll 48 may include a frustoconical surface portion 60 which will diverge from the cylindrical surface of the mandrel 43 so as not to mechanically interfere therewith. In addition, the press roll 48 includes a generally conical peripheral surface portion 62 which, in cooperation with the cylindrical surface of the mandrel 43, defines the varying height gap 52.

The contour of the surface 62 is selected to provide a predetermined radial density distribution, or gradient, in the nonwoven tubular product 42 produced by the spray spinning apparatus. An example of the manner in which the contour of the surface 62 may be utilized will now be discussed.

If it is assumed that the filaments projected against the collection means 12 (see FIG. 2) are distributed uniformly throughout the imaginary spray cones 32, 34, 36, the substantially continuous filaments will accumulate on the mandrel 43 at a rate which is uniform between the first end 54 (see FIG. 4) and the second end 56. If it is desired to create a tubular nonwoven member having a uniform radial density, i.e., one which is constant in the radial direction, it is preferred that the filament volume laid down on the volume of filaments previously laid down in each successive annular incremental volume around the mandrel, be the same for each incremental distance on the mandrel between the ends 54, 56. More particularly, if it is assumed that there are three axial increments in which the fibers are deposited on the mandrel, corresponding generally to the lateral extent of the three imaginary cones 32, 34, 36 (see FIG. 2), a uniform radial density will be attained if the volume per unit length (i.e., area) deposited by each of the three spray cones in the tubular cross section is equal.

Figure 6:
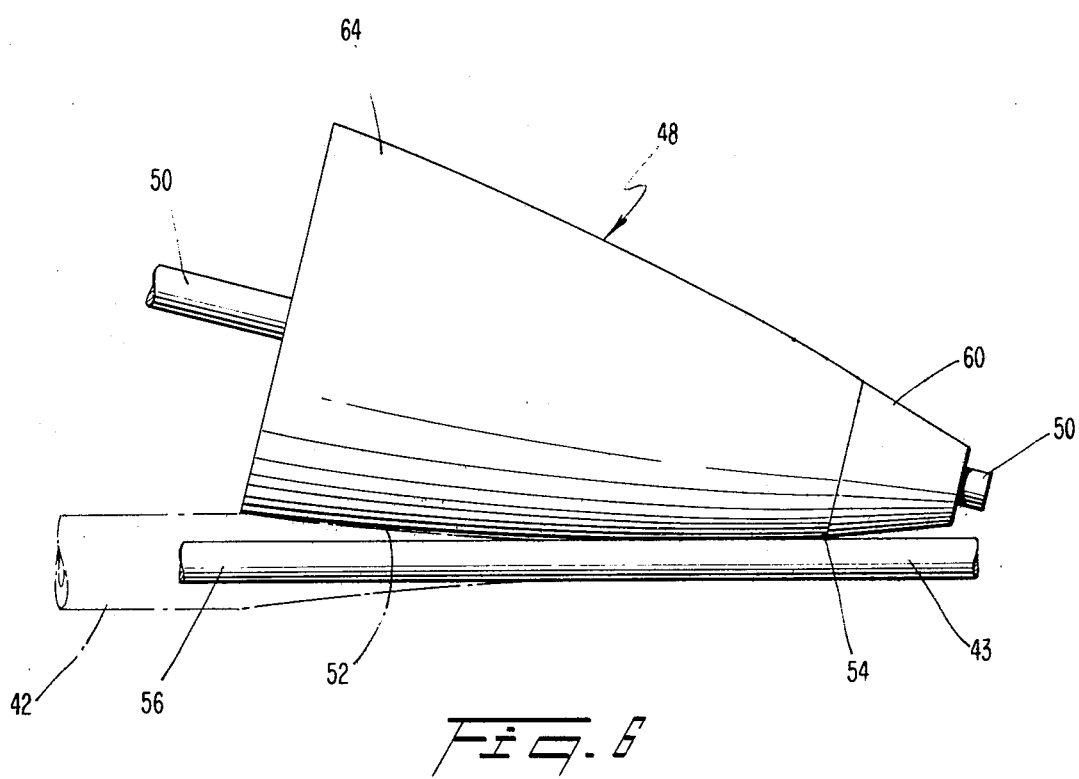
FIG. 6 is a view similar to FIG. 4 disclosing an alternate embodiment of the press roll.

Thus, as shown in FIG. 5 in the cross section of a tubular product, the area 64 defined between radii $R_1$ and $R_2$ must be equal to the area 66 defined between radii $R_2$ and $R_3$ which in turn must be equal to the area 68 defined between the radii $R_3$ and $R_4$. That is to say, the volume of fibers deposited per unit area is the same for each of the annular areas 64, 66, 68. The radii $R_2$, $R_3$ can be determined from elementary mathematical principles and are translated into a gap height 52 at specific points (see FIG. 4), for example, at points 70 and 72 along the axis of the mandrel 43. The peripheral surface 62 of the press roll is then provided with a contour which satisfies the conditions of the minimum gap height at the first end 54 and the maximum gap height at the second end 56 and a gap height which varies so as to provide the determined radial gap heights at points 70, 72. Naturally, this analysis can be broken down into as many axial and corresponding radial increments as may be desired.

Where the distribution of filaments deposited by the spray spinning head is non-uniform, such non-uniformity variations can also be accommodated in the design of the surface contour 62 by appropriate weighting factors which are distributed axially along the mandrel 43. Moreover, predetermined radial density gradients are attained by applying a corresponding weighting factor to volume per unit length of the incremental annular volumes. Another condition which is applied to the surface contour is that the press roll and the mandrel must cooperate to urge the nonwoven tubular product off the mandrel by virtue of a skew angle between them.

Where the radial density variation is desired to decrease radially outwardly, the contour of the peripheral surface of the press roll 48 may also be convex as illustrated at 64 in FIG. 6. In this manner, the filamentary material deposited in the region close to the first end 54 of the gap is not only deposited but is also greatly compressed, whereas the material deposited near the second end 56 is not compressed to as appreciable an extent.

It will thus be apparent that in designing the contour of the press roll peripheral surface it is possible to provide a tubular product 42 having a radial density distribution which can be uniform; which can decrease radially outwardly; which can increase radially outwardly; or have any other desired distribution.

Moreover, in order to change the density characteristics of the tubular product 42, it is only necessary to change the press roll 48, providing a substantial savings in time and capital expense while having the attribute of simplicity.

An annular area of defined for example, as the difference between the area determined by $R_3$ and the area determined by $R_2$ i.e., $(R_3^2 - R_2^2)$. The annular area must vary axially along the mandrel means in accordance with a predetermined relationship. That predetermined relationship will cause a surface having a specific contour on the press roll. Where a constant radial density is desired, the annular area will increase linearly with length along the mandrel 43 in a direction away from the first end 54. For radially increasing or radially decreasing density distribution, the variation of annular area axially along the mandrel 43 will be determined according to the desired density variation.

For example, by knowing the radii of the various annular areas, one can determine the center of gravity of each annular area. By assuming this center of gravity radius is located above the spray cone axes and also knowning the position of each axis along the mandrel length, one can determine the curve, i.e., curvature of the surface of the press roll.

In operation, a particulate synthetic resinous feed material, such as nylon, polyethylene terephthalate, or polypropylene, is plasticated in the extruder 13 and supplied to the melt pumps 14, 16, 18 where the plasticated material is pressurized and advanced to orifice openings of the corresponding plurality of nozzle assemblies 20, 22, 24. Air jets surrounding each nozzle body 26 attenuate the corresponding filament to reduce its diameter and convey the substantially continuous filament that results downstream toward the collection device 12.

The substantially continuous filaments are thus sprayed by the air jets at the rotating mandrel 43 (FIG. 3) which, in cooperation with the press roll 48, collects and compresses the filaments with a pinching motion between the rotating members. More specifically, since the mandrel rotates in a counterclockwise direction and the press roll rotates in a clockwise direction, the substantially continuous filaments are guided and compressed by the press roll 48 onto the mandrel 43.

The mandrel 43 and the press roll 48 cooperate to define a gap of variable radial height in which the substantially continuous filaments are collected as a nonwoven tubular structure 46. As the filaments are compressed between the press roll 48 and the mandrel 43, they are still in a sufficiently softened state that fiber-to-fiber bonding occurs. This bonding is enhanced by the pressure exerted between the press roll 48 and the mandrel 43. In addition, the surface of the press roll 48 is configured so that the radial height of the gap 52 increases toward the distal end of the mandrel and that, combined with a skewing of the respective axes results in a rector force which urges the tubular product 42 being formed axially off the mandrel 43.

It should now be apparent that a press roll constructed in accordance with the present invention may be easily changed with a relative minimum of time and expense in order to change the characteristics of the density gradient in the resulting tubular product. In addition, the press roll itself is easily fabricated and does not require an enormous capital investment. On the other hand, where variations in radial density are effected by changing the inclination and lateral spacing of spinning orifices, it will be apparent that there would be a substantial time and financial investment required to easily change the density distribution of the resulting tubular product.

It is now apparent that a collection device constructed as described above has many advantages when compared to the prior art. Moreover, it will be apparent to those skilled in the art that numerous modifications, variations, substitution and equivalents for the features of the invention exist which do not materially depart from the spirit and scope of the invention. Accordingly, it is expressly intended that all such modifications, variations, substitutions and equivalents which fall within the spirit and scope of the invention as defined in the appended claims be embraced thereby.

What is claimed is:

1. Spray spinning apparatus form making a tubular non-woven product of indefinite length having a predetermined radial density gradient, comprising:

spray spinning means for producing a plurality of substantially continuous filaments of synthetic resinous material, attenuating the filaments, and conveying the filaments in a stream such that the filaments have a predetermined distribution along a line passing transversely through the filament stream; and collection means positioned transversely of the filament stream, operable to collect the filaments and form a tubular non-woven product of indefinite length therefrom, and including mandrel means operable to receive the filaments along an axial extent thereof and having a cylindrical surface, and press roll means operable in conjunction with the mandrel means to urge the collected filaments axially off the mandrel means as a tubular product of indefinite length, and including a contoured surface which cooperates with the cylindrical surface to define a gap of varying radial height in which the predetermined distribution of filaments is collected and compressed to a predetermined radial density gradient.

2. The spray spinning apparatus of claim 1 wherein the contoured surface of the press roll means is concave.

3. The spray spinning apparatus of claim 2 wherein the press roll means surface is configured so that the gap height provides a constant radial density gradient.

4. The spray spinning apparatus of claim 2 wherein the press roll means surface is configured so that the gap height provides a radial density gradient which decreases with increasing radius from the cylindrical surface.

5. The spray spinning apparatus of claim 2 wherein the press roll means surface is configured so that the gap height provides a radial density gradient which increases with increasing radius from the cylindrical surface.

6. The spray spinning apparatus of claim 1 wherein the contoured surface of the press roll means in convex.

7. The spray spinning apparatus of claim 1 wherein a portion of the contoured surface of the press roll is concave.

8. the spray spinning apparatus of claim 1 wherein a portion of the contoured surface of the press roll is convex.

9. The spray spinning apparatus of claim 7, wherein another portion of the contoured surface of the press roll is convex.

* * * * *